United States Patent
Lack et al.

(10) Patent No.: US 6,910,235 B2
(45) Date of Patent: Jun. 28, 2005

(54) ADJUSTABLY INSULATIVE CONSTRUCT

(75) Inventors: Craig D. Lack, Wilmington, DE (US); Brian Farnworth, Elkton, MD (US)

(73) Assignee: Core Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/230,889

(22) Filed: Aug. 29, 2002

(65) Prior Publication Data

US 2004/0040087 A1 Mar. 4, 2004

(51) Int. Cl.[7] .............................................. A41D 13/00
(52) U.S. Cl. ................................... 5/413 AM; 5/655.3
(58) Field of Search ....................... 5/710, 718, 655.3, 5/644, 413 AM; 2/89, 69.5, 82, 216, DIG. 3

(56) References Cited

U.S. PATENT DOCUMENTS

| | | | | |
|---|---|---|---|---|
| 4,274,158 A | * | 6/1981 | Pogorski et al. ............... | 2/2.16 |
| 4,307,004 A | * | 12/1981 | Schuhmacher et al. ...... | 523/337 |
| 4,547,906 A | | 10/1985 | Nishida et al. .................. | 2/93 |
| 4,685,155 A | * | 8/1987 | Fingerhut et al. .............. | 2/272 |
| 4,713,068 A | | 12/1987 | Wang et al. ................. | 604/366 |
| 4,864,656 A | * | 9/1989 | Nesse ............................... | 2/97 |
| 5,102,711 A | | 4/1992 | Keller et al. .................. | 428/71 |
| 5,458,516 A | * | 10/1995 | Uglene et al. ............... | 441/104 |
| 6,286,145 B1 | * | 9/2001 | Welchel et al. .................. | 2/69 |
| 6,490,736 B2 | * | 12/2002 | Phillips ......................... | 2/242 |

FOREIGN PATENT DOCUMENTS

| | | |
|---|---|---|
| DE | 942 165 | 4/1956 |
| DE | 17 56 765 | 10/1970 |
| DE | 27 46 219 | 4/1979 |
| DE | 31 05 941 | 9/1982 |
| EP | 0 245 889 | 11/1987 |
| FR | 1 309 206 | 11/1962 |
| FR | 2 759 562 | 8/1998 |
| GB | 2 343 152 | 5/2000 |
| SE | 9 903 151 | 3/2001 |
| WO | WO 03/047376 | 6/2003 |

OTHER PUBLICATIONS

Ajungitak—XP 002278412 Kompakt Shelter—Jul. 13, 2001—retrieved from the Internet Apr. 8, 2004.
Mammut 2003 Catalog—pp. 86, 89 Sleeping Bag Shelters.

* cited by examiner

Primary Examiner—Heather Shackelford
Assistant Examiner—Fredrick Conley
(74) Attorney, Agent, or Firm—Dianne Burkhard

(57) ABSTRACT

A multi-layered, composite, inflatable and deflatable article of manufacture is provided. The article includes at least two layers of a flexible, waterproof, air impermeable, optionally water-vapor-permeable material, the two layers forming at least one inflatable compartment therebetween. The two layers have at least one additional layer of a porous insulating material, e.g., batting, disposed between them within the compartment. The layers are all adhesively bonded together about the periphery of the compartment and, optionally, at discrete locations within the periphery of the compartment. The porous insulating layer is otherwise unattached to either of the waterproof layers, and preferably is not otherwise attached to either. The compartment has at least one sealable opening therein through which air may be injected into or removed from the compartment, as desired, to thereby inflate or deflate the compartment to a desired volume and to thereby control its insulative value. The construct of the invention is useful, inter alia, in garments, in air mattresses, in sleeping bags, or in a combination air mattress and sleeping bag, and in various bed covers.

18 Claims, 5 Drawing Sheets

ADJUSTABLY INSULATIVE CONSTRUCT

BACKGROUND OF THE INVENTION

The present invention relates to insulative constructions useful in garments, sleeping bags, air mattresses and the like, wherein the insulative value of the garment or other construction is adjustable by the user. The layered construction of the invention includes an insulative layer which is adhesively fixed in place relative to all other components in the construction, thereby alleviating an existing problem associated with known insulated garments and the like, namely the migration of the insulation within garment components, resulting in undesirable hot and/or cold zones in a construction intended to be uniformly insulative.

Inflatable garments and air mattresses and the like are known. International Patent Publication WO98/10669 (19 Mar. 1998, commonly assigned), discloses an inflatable insulation module for an insulated garment which includes an inner and an outer membrane sealed together to form an inflatable cavity. The membrane is formed of a water-vapor-permeable, breathable material, allowing the escape of moisture from the wearer. The membrane is also air-impermeable to allow inflation of the module, the result being that the insulation value of the garment, for example, may be varied by the user by varying the amount of inflation introduced into the garment.

International Patent Publication WO 01/84989A1 (15 Nov. 2001) discloses a heat insulating device for an item of clothing, including a shell filled with a heat insulating material. Both this device and the aforementioned insulation module include at least one inlet/outlet for introducing a gas (air) therein in order to adjust the insulative value of the garment.

The inherent disadvantages of the known insulating constructions are substantially overcome by the insulative constructions of the present invention, which invention is described fully in the following specification and in the accompanying drawings.

SUMMARY OF THE INVENTION

A multi-layered, composite, inflatable and deflatable construct is provided. The construct includes at least two layers of a flexible, waterproof, air impermeable, optionally water-vapor-permeable material, the two layers forming at least one inflatable compartment therebetween. The two layers have at least one additional layer of a porous insulating material disposed between them within the compartment.

The at least two layers and the additional insulative layer are adhesively bonded together about the periphery of the compartment and, optionally, at discrete locations within the periphery of the compartment. The adhesive penetrates the porous insulating material and bonds the layers together to form a waterproof, airtight seal for the compartment extending around the periphery of the compartment. The porous additional insulating material layer is otherwise unattached to at least one of the waterproof layers, and preferably is otherwise unattached to either layer. The compartment has at least one sealable opening therein through which air may be injected into or removed from the compartment, as desired, to thereby inflate or deflate the compartment to a desired volume. These layers may form multiple compartments within a single construct.

Preferably, the at least two layers are of a water-vapor-permeable, i.e., "breathable", material.

Useful constructs may include garments, such as a vest, a jacket, a pant, a glove, a coat, a hat, a sock, a boot or other suitable garment. Alternatively, the construct may be in the form of a mattress, a sleeping bag or a combination mattress and sleeping bag, or in the form of the various bed covers.

Preferably, the waterproof, air impermeable, water-vapor-permeable material is a membrane of a thermoplastic polyurethane, or a thermoplastic polyester.

The additional layer of porous insulating material is preferably a layer of a batting material, most preferably a fibrous batting material such as Primaloft® batting.

The construct may be adhesively bonded together using an adhesive from the class consisting of polyurethane, reactive polyurethane, thermoplastic polyurethane, silicone, flexible epoxy and PVC adhesives. The preferred adhesive is a thermoplastic polyurethane.

At least one reinforcing layer may be affixed to each of the at least two layers of waterproof, air impermeable, water-vapor-permeable material to impart strength and/or abrasion resistance thereto. The reinforcing layer may be a textile fabric disposed internally and/or externally of the at least two layers, or both.

The textile fabric may be of woven, knit or nonwoven fabrics, and may include nylon, polyester, polypropylene, polyaramid and cotton textile fabrics. In a preferred construction, the textile fabric is nylon.

The at least two layers may be composite layers of a flexible, first layer of hydrophobic material having a moisture vapor transmission rate exceeding 1000 gms/m$^2$/24 hours and an advancing water contact angle exceeding 90 degrees, and a continuous hydrophilic layer attached to the inner face of the first layer, the hydrophilic layer having a moisture vapor transmission rate exceeding 1000 gms/m$^2$/24 hours. The hydrophobic layer is preferably microporous, expanded polytetra-fluoroethylene and the hydrophilic layer may be a polyether-polyurethane.

The constructions of the invention may have multiple, additional porous insulating layers contained therein, and the sealable opening may be valved and may include, in combination, an independent air supply which may be removably affixed to the construct. The air supply may include a pump for pumping ambient air into and/or out of the compartment. In this combination, preferably, the pump is a removably attachable bellows pump and the valve is bi-directional. Alternatively, air may be injected into or extracted from the compartment orally, by blowing into or sucking out from a tube affixed to the opening.

The combination sleeping bag and air mattress of the invention is preferably one wherein the air mattress includes at least two layers of a flexible, waterproof, air impermeable, optionally water-vapor-permeable material, the two layers forming at least one compartment therebetween, the two layers having at least one additional layer of a porous insulating material disposed between the two layers, and within the compartment. The at least two layers and the additional layer are adhesively bonded together about the periphery of the compartment and, optionally, at discrete locations within the periphery of the compartment, forming a waterproof, airtight seal for the compartment extending around its periphery. The porous additional insulating material layer is otherwise unattached to at least one of the at least two layers, and preferably is otherwise unattached to either layer, and the compartment has at least one opening therein through which air may be injected into or removed from the compartment. The sleeping bag component in this combination comprises a layered composite of an outer layer of an air permeable, waterproof material, a middle layer of a porous insulating material, and an inner layer of a woven textile material, this sleeping bag component also optionally including an external shell, the air mattress component and the sleeping bag component being in registry, one to the other, and being adhesively bonded, one to the other, about the periphery of the sleeping bag component except at the access opening to the sleeping bag.

Independently and alternatively, a sleeping bag is provided including an upper panel of at least two layers of a flexible, breathable, optionally air-impermeable material, the upper layer being waterproof, the two layers forming at least one compartment therebetween, the two layers having at least one additional layer of a porous insulating material disposed between the two layers and within said compartment, the upper panel being in registry with a lower panel of at least two layers of a flexible, breathable, optionally air-impermeable material, the lower layer being waterproof with the two layers forming at least one compartment therebetween, the two layers having at least one additional layer of a porous insulating material disposed between the two layers and within said compartment, the sleeping bag also having an optional outer shell layer external to both upper and lower panels. In this construction, all layers of all panels are adhesively and sealingly bonded about the periphery of the sleeping bag except at the access opening thereof.

Figure 10:
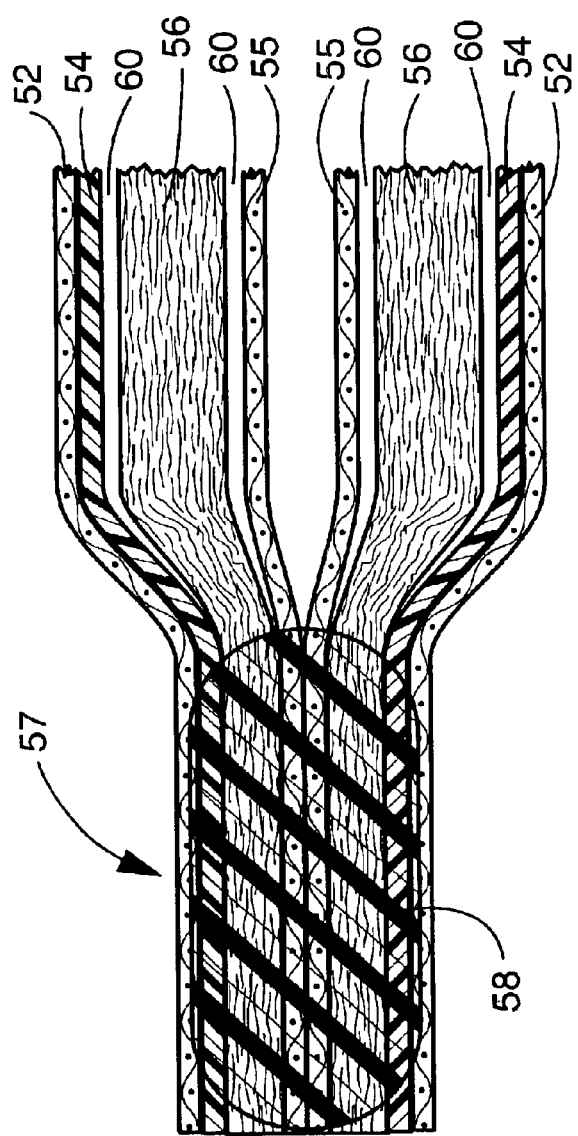
Figure 11:
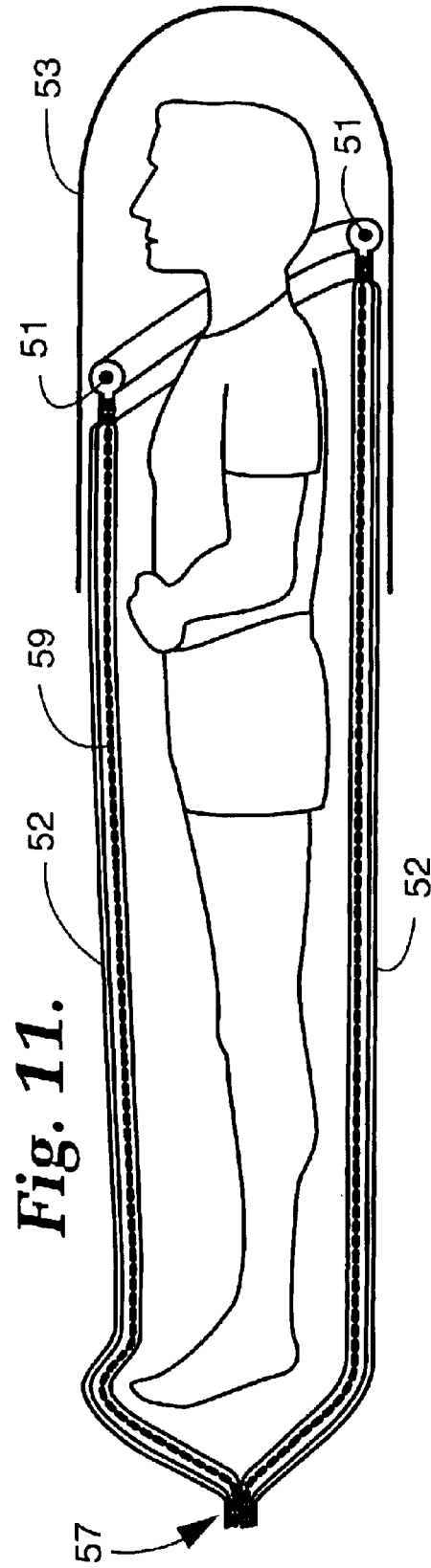

A sleeping bag constructed according to the principles of the invention is depicted in FIGS. 10 and 11, wherein an edge bond extends around the periphery of the bag, shown in a schematic diagram, including a person enveloped within the bag in FIG. 11.

Figure 12:
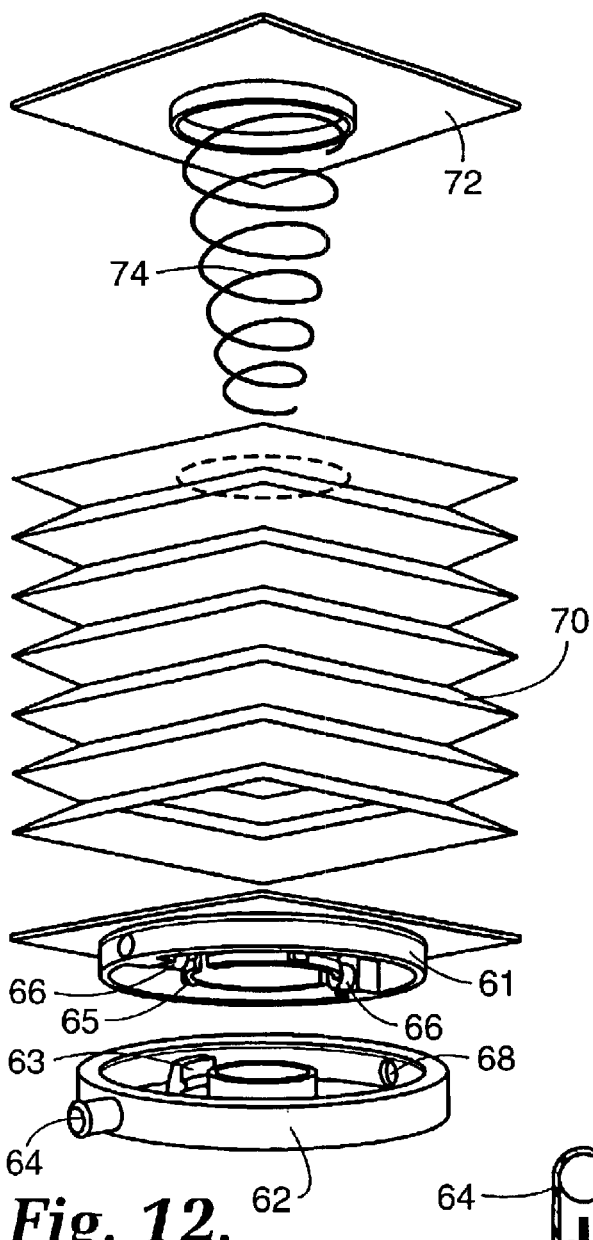

FIG. 12 is a schematic, perspective diagram of a bellows pump suitable for attachment to the inflatable construct of the invention and capable of both forced inflation and forced, rapid deflation of the sealed compartments therein.

Figure 13:
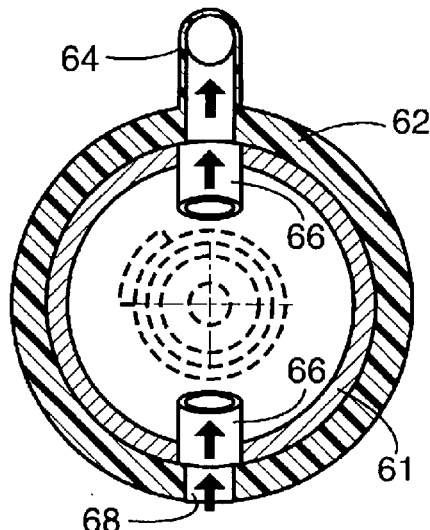
Figure 14:
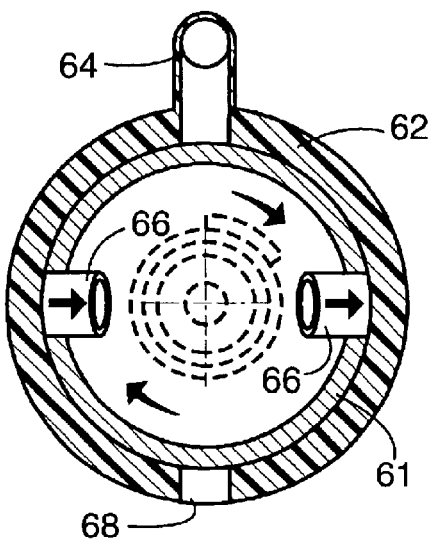
Figure 15:
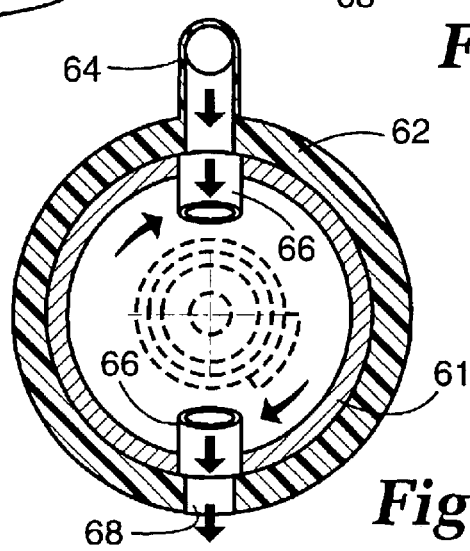

FIGS. 13–15 show alternative schematic diagrams, partly in perspective and partly in cross-section, of valving configurations suitable for pumping air into (FIG. 13) and out of (FIG. 15) an inflatable construct connected to the pump (not shown), and of the neutral valve position (FIG. 14), wherein air is retained and sealed within the inflatable construct.

DETAILED DESCRIPTION OF THE INVENTION AND PREFERRED EMBODIMENTS WITH REFERENCE TO THE DRAWINGS

A multi-layered, composite, inflatable and deflatable article of manufacture is provided. The article includes at least two layers of a flexible, waterproof, air impermeable, optionally water-vapor-permeable material, the two layers forming at least one inflatable compartment therebetween. The two layers have at least one additional layer of a porous insulating material, e.g., batting, disposed between them within the compartment. The layers are all adhesively bonded together about the periphery of the compartment and, optionally, at discrete locations within the periphery of the compartment. The porous insulating layer is otherwise unattached to at least one of the waterproof layers, and preferably is otherwise unattached to either. The compartment has at least one sealable opening therein through which air may be injected into or removed from the compartment, as desired, to thereby inflate or deflate the compartment to a desired volume and to thereby control its insulative value. The con-struct of the invention is useful, inter alia, in garments, in air mattresses, in sleeping bags, or in a combination air mattress and sleeping bag, and in various bed covers.

Figure 1:
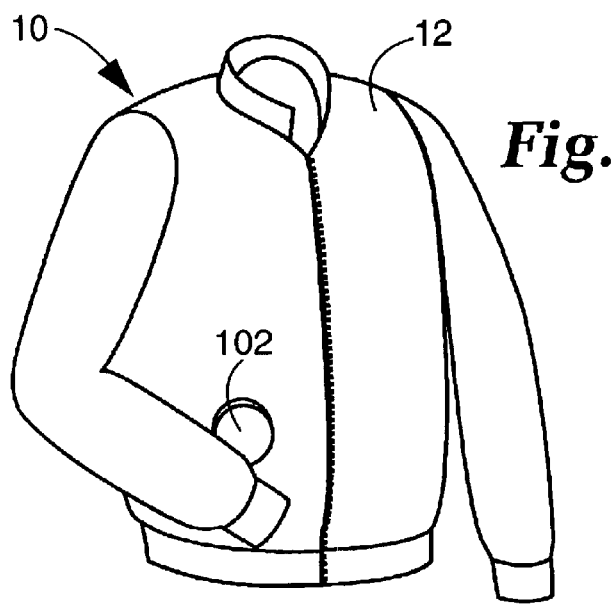
FIG. 1 is a schematic, perspective view of an inflatable vest according to the present invention, having an integral air pump affixed thereto, depicted in its inflated state.
Figure 2:
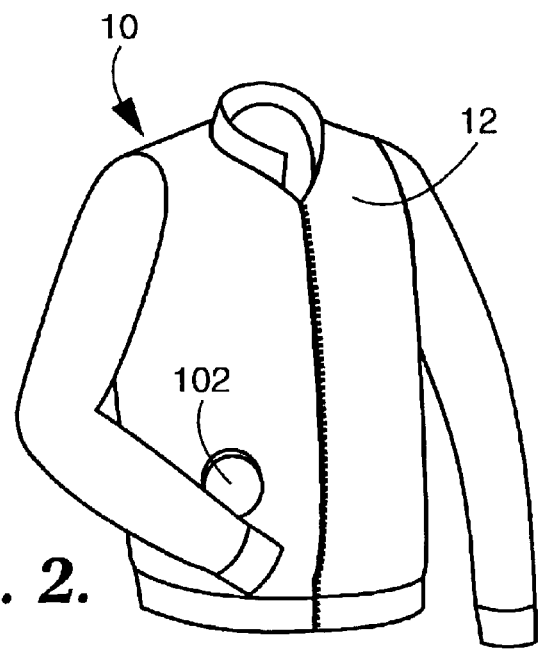
FIG. 2 shows the vest of FIG. 1, deflated.

A detailed description of the invention and its preferred embodiments is best provided with reference to the accompanying drawings wherein FIG. 1 depicts, schematically, a vest 10, having an outer shell layer 12, described in detail below. In FIG. 1, the garment 10 is shown fully inflated, thus providing the maximum attainable heat insulative values possible for the garment. FIG. 2 shows the same vest 10, but in its deflated configuration. In both FIGS. 1 and 2, a removably attached, portable air pump 102 is schematically represented for illustration as attached externally to the vest 10. This pump is preferably and conveniently hidden from view within a pocket in vest 10. A specific pump is described in detail below.

Prior to sewing it together, the vest 10 is shown in pattern form in FIG. 3, wherein the components of the vest 10 are sealingly bonded around the periphery thereof by adhesive 18, also described further below. The pump 102 is included in the diagram for completeness in illustration.

The inflatable construct according to one aspect of the invention, whether it be a garment, an air mattress, a sleeping bag, or other construction, is formed by adhesively bonding together, to form at least one waterproof, air tight, optionally water-vapor-permeable compartment therein, at least two layers of a waterproof, air impermeable, optionally water-vapor-permeable material, and including between these two layers at least one additional layer of a porous insulating material. All of these layers are adhesively bonded together about the periphery of the compartment, and also optionally bonded together at discrete locations within the periphery of the compartment. The adhesive penetrates the interstices of the porous, insulative inner layer and affixes it in place, the result being that the insulation layer cannot move about between the two waterproof, air impermeable layers, thereby eliminating hot and cold zones caused by insulation migration within such constructions.

One embodiment of the layered construction according to the invention, and its various components, is depicted in greater detail in FIGS. 4–7. Therein, an inflatable garment construct is illustrated in schematic cross-section to comprise two fabric panels of a fabric shell layer 12, each fabric layer 12 laminated to an air-impermeable, moisture-vapor-permeable layer 14, and having an inner layer 16 of a porous insulative material sandwiched between the two fabric composite panels. The textile fabric may be woven, knit, or of a non-woven fabric material. The fabric shell layers may be one of several suitable materials, including polyester, nylon, polypropylene, polyaramid, and including natural fabrics such as cotton. The air-impermeable, water-vapor-permeable material 14 preferably is a composite layer of a microporous, expanded polytetrafluoroethylene (PTFE) membrane having adhered thereto, on the membrane side opposite the fabric shell, a moisture-vapor-permeable polyurethane layer. Such a composite layer is disclosed in commonly assigned U.S. Pat. No. 4,194,041, incorporated herein by reference thereto.

Generally speaking, suitable layers which may be incorporated into constructions of the present invention may include single layer materials which are air impermeable, materials which are inherently air impermeable and moisture vapor permeable, materials which are coated or otherwise treated to render them air impermeable, materials which are coated or otherwise treated to render them air impermeable and moisture vapor permeable, or laminates of materials which incorporate an air impermeable and optionally moisture vapor permeable layer. Preferred layers are air impermeable, moisture vapor permeable fabrics which may be incorporated in the constructions of the present invention, which typically possess moisture vapor transmission rates (MVTR) in the range of greater than 2000 g/m$^2$/24 hours, more preferably greater than 5000 g/m$^2$/24 hours. A particularly preferred laminate for use in the present invention comprises a laminate of a microporous membrane and an air-impermeable, moisture-vapor-permeable layer, available from W. L. Gore & Associates, Inc., Elkton, Md. Another particularly preferred laminate for use in the present invention comprises a laminate containing a breathable polyurethane layer that is air-impermeable and moisture-vapor-permeable such as those available from Narcote, LLC, Piney Flats, Tenn. These are discussed further in the examples which follow.

The preferred air-impermeable, moisture-vapor-permeable materials include, but are not limited to, polyurethane and composites of polyurethane and PTFE. Preferred polyurethane layers, alone or used as a composite with other materials, may have a thickness of 0.005 inches or less, preferably 0.003 inches or less. Most preferred polyurethanes have thicknesses of 0.002 or less to 0.0015 or less. This air-impermeable, moisture-vapor-permeable material is laminated or coated on at least one side of a reinforcing textile layer to form the breathable fabric layer. Preferred breathable fabric layers include PTFE/polyurethane composites laminated to knit or nonwoven fibrous sheets, polyurethanes laminated to knits or nonwovens, and particularly preferred are expanded PTFE/polyurethane composites.

Figure 4:
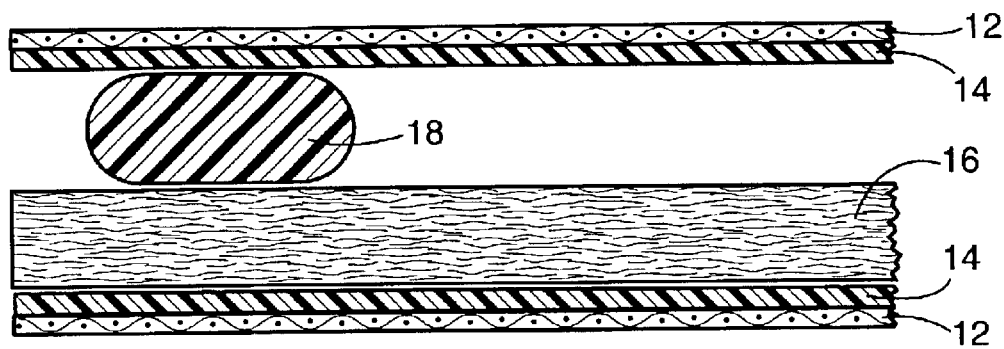
FIG. 4 is a schematic diagram, in cross-section, of the several layers and adhesive which are employed in one embodiment of the invention, prior to effecting sealing and bonding of the layers together.

The various layers are all arranged as shown schematically in FIG. 4, and an adhesive 18, preferably in the form of a bead around the periphery of the panels and elsewhere where adhesion is required, is applied, between the composite panels 12, 14 and the insulative layer 16. This adhesive 18 may be any suitable adhesive, and may include polyurethane, thermoplastic polyurethane, silicone, flexible epoxy and PVC adhesives. A preferred adhesive is a reactive polyurethane, available from the Covert Company, Inc., under product designation "SUPURGRIP™ 2050" adhesive.

Figure 5:
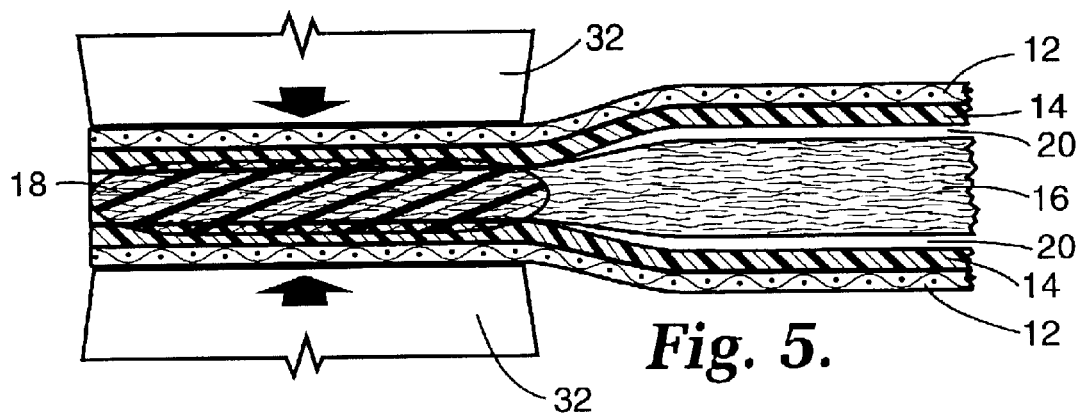
FIG. 5 is a cross-sectional schematic diagram of the layers and adhesive shown in FIG. 4, to which heated platens are being applied to effect sealing and bonding of the various layers together.
Figure 6:
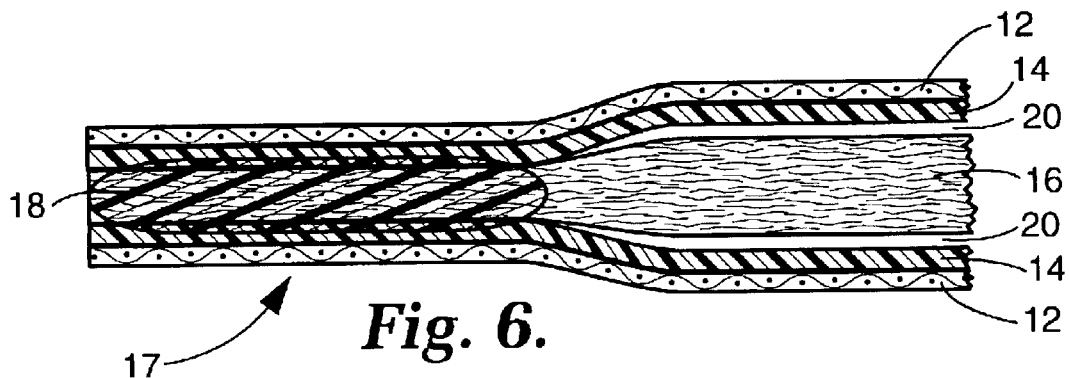
FIG. 6 is a cross-section of a peripheral bond formed in one embodiment of the invention.

After the adhesive 18 is applied in the desired pattern as beading between the layers of composite as shown in FIG. 4, heat and pressure are applied by platens 32 (or raised rolls, etc.) as illustrated in FIG. 5 to compress the layers together and force the adhesive 18 into and through the pores of the porous insulative layer 16 and effect a seal 17 along the line of applied adhesive, as shown in FIG. 6. In simplest terms, as used herein, the adhesive must be one which will penetrate through the porous insulation layer 16 at the heat and pressure applied, and which forms an airtight, waterproof seal upon setting or curing. FIG. 6 illustrates an adhesive seal 17 substantially at the edge and extending around the periphery of the joined layers 12, 12, 14, 14 and 16. Important to the invention herein is the completed construction illustrated in FIG. 6, wherein sealing is effected at the locations of applied adhesive 18, leaving air gaps 20, 20 between the insulation layer 16 and the composite textile layers 12, 14. In other words, this porous insulative layer is otherwise unattached to at least one, preferably both, of the aforementioned at least two composite layers 12, 14, except at the loci of applied adhesive.

Figure 7:
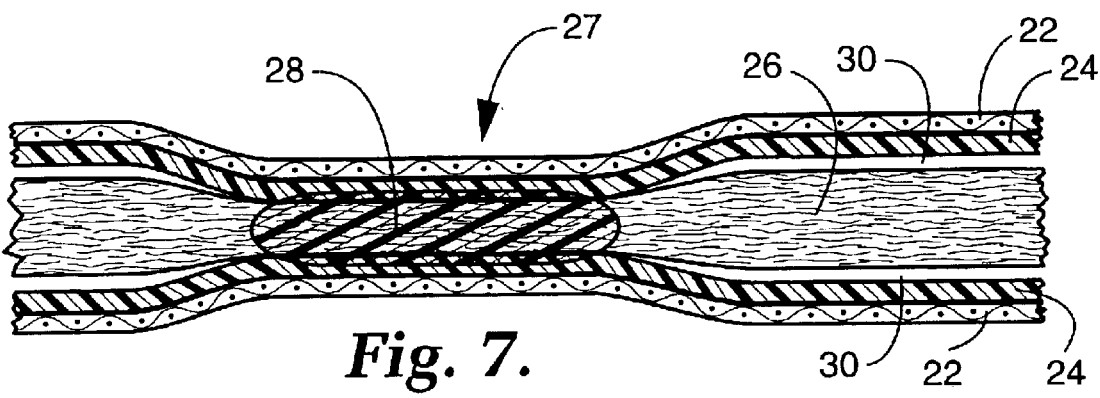
FIG. 7 depicts, schematically, in cross-section, one internal bond between inflatable compartments formed in an alternate embodiment of the inflatable and deflatable construct of the invention.

FIG. 7 illustrates, also schematically, the cross-section of an adhesive seal 27 which separates plural, inflatable compartments such as the individual compartments in an air mattress, discussed further below. In FIG. 7, the textile layers 22, 22 having attached air-impermeable, water-vapor-permeable membranes 24, 24, sandwich the porous, insulative layer 26. The applied adhesive, 28, upon application of heat and/or pressure, penetrates the interstices of the porous layer 26 and extends therethrough, and, upon setting of the adhesive, forms the interior seal 27 around the respective inflatable compartments formed by the air gaps 30, 30 within this construct. Such multiple compartments may be formed, as desired, in garments such as jackets, in sleeping bags, in air mattresses, and in any other similar construction. The only further requirement is that air passages be provided connecting the various compartments if all compartments are to be inflated by a single air pump. An alternative embodiment of this construction is illustrated in FIG. 8.

Figure 8:
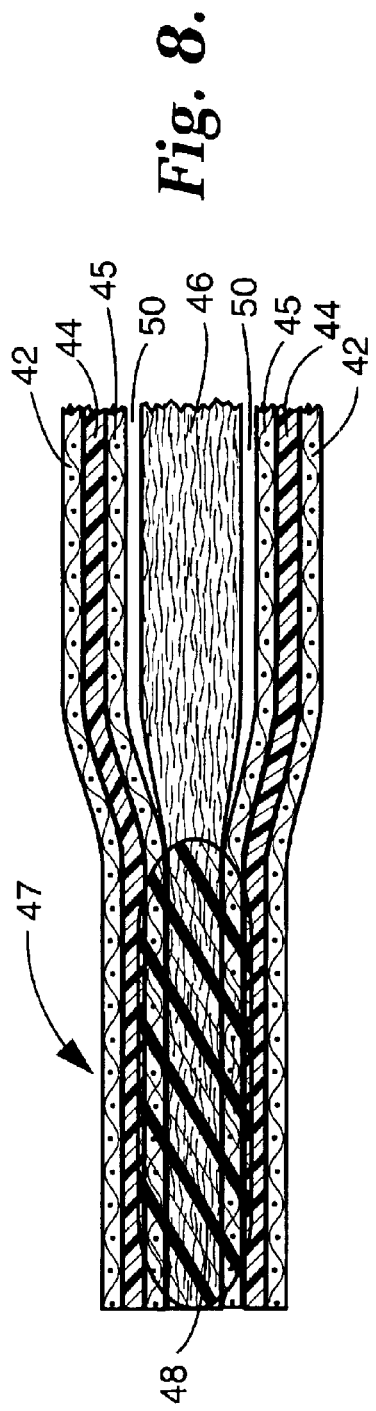
FIG. 8 shows the cross-section of one bonded edge of an air mattress constructed according to the principles of this invention, and a perspective view of this mattress, shown partly in cross-section, is depicted in FIG. 9.

FIG. 8 illustrates a construction wherein outer textile fabric layers 42, 42, which may be polyester knit fabric layers having attached layers 44, 44 of an air-impermeable, water-vapor-permeable membrane having attached to the inner surfaces thereof the additional inner fabric layers 45, 45, sandwich the porous, insulative layer 46, leaving the inflatable air spaces 50, 50. The adhesive-sealed, watertight, air tight edge thereof, 47, is sealed as shown by the adhesive 48, which seal extends about the periphery of the inflatable compartment. In FIG. 8, the layers 44, 44 may be composite layers of microporous, expanded PTFE membranes having an air-impermeable, moisture-vapor-permeable polyurethane layer affixed to the side opposite the polyester shell layers 42, 42. The inner layers 45, 45 may also be polyester knit fabric layers. The preferred adhesive in this construction is a polyurethane adhesive which is extruded as a beading 48 around the periphery of the construction, in FIG. 8 shown after application of heat and pressure. The porous, insulative inner layer 46 in this construction may be a porous, batting layer, and Primaloft® batting, produced by Albany International, Inc., is a preferred insulating layer.

The present invention is also useful in sleep systems wherein variable insulation is often desired. As an air mattress, this invention can be used to provide an insulation layer between two airtight layers so that, when inflated, the mattress provides both cushioning and thermal insulation. Upon deflation, air can be withdrawn from the mattress to create a very small, stowable, package that is ideal for carrying and storage.

Figure 9:
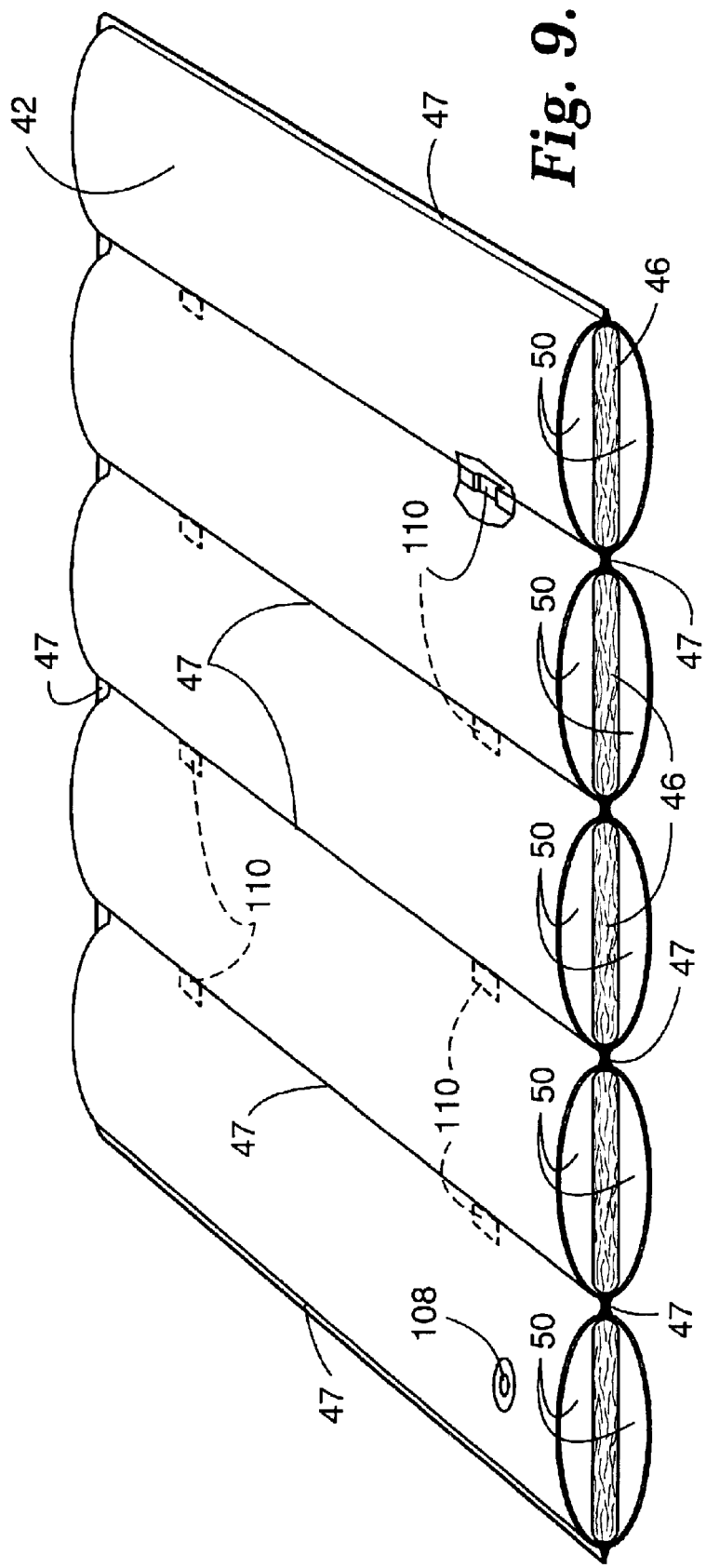

A schematic perspective view of an air mattress constructed according to the principles of the invention, partly in cross-section, is depicted in FIG. 9. The air mattress is formed with a plurality of transversely extending inflatable compartments sealingly separated, one from the other, along the plurality of seams 47, except that openings 110 permit the passage of air from compartment to compartment. The outer shell layer 42, and its adjacent layers, are all sealed along the transverse seams 47 and at the peripheral seams 47 shown in the figure. The longitudinal cross-section through this air mattress reveals the insulative layer 46, fixed and anchored within the air mattress, and having inflatable air compartments 50, 50 adjacent thereto. An opening 108, through which air may be introduced or expelled, as desired, is shown schematically in the figure.

In a further alternate configuration of a construction according to another aspect of the invention, shown in FIGS. 10 and 11, and especially suitable for sleeping bags, an outer shell layer of a fabric 52 has affixed thereto an optionally air-impermeable, breathable membrane layer 54, which encases a porous, insulating batting layer 56 with an inner textile layer 55, as shown, and a mirror image of this construction is affixed thereto at edge seal 57 by adhesive 58, all as depicted in the cross-section of FIG. 10. The seal 57 may extend around the periphery of the sleeping bag, as depicted in FIG. 11, except at the entrance of the bag into which the user crawls. Alternatively, the bag itself could be constructed as a single, double-wide layered composite construction, and then folded over at one longitudinal edge, and the seal 57 formed along the bottom and along the second longitudinal edge only, terminating at the entrance opening. Still further, and alternatively, the outside two-layer shell layers 52, 54 could be formed of three layers as shown in FIG. 8.

FIG. 11 depicts a sleeping bag in use having, for purposes of completeness, draw strings 51 for closure extending through a draw string tunnel, a hood 53, optionally detachable and of suitable construction, and a person encapsulated in the sleeping bag construction. Omitted from FIG. 11 is an optional valved air opening for introducing and/or expelling inflating air, as desired, the connections for which will be known and readily apparent to one skilled in the art. Air inflation of this construction is only available, obviously, in the embodiment in which layers 52, 55 are air impermeable.

One (of many possible) attachable, removable, portable and convenient valved air pumps for use in inflating and/or deflating the inflatable compartments in the constructs of the invention is shown in FIG. 12. Therein, a bellows pump is depicted having a top 72, bellows 70, base 61, adjustable ring diverter 62, having port 64, the ring diverter 62 being circumferentially affixable to the base 61 and slidably rotatable with respect thereto. Resilient spring 74 forces the bellows 70 to return to "open" upon compression of the bellows. Detent 63, which snaps over the ledge in the inner ring 65 within the base 61 provides attachment means for affixing the ring 62 to the base 61. One-way valves 66 complete the construction of this rudimentary, valved, portable air pump. Such an air pump is intended to be illustrated as removably attachable to the garment illustrated in FIG. 1, and is concealable within a pocket thereof. This pump is represented schematically in FIGS. 1–3 at 102 thereof.

Flow through the inlet/outlet port 64 of the pump of FIG. 12 is controllable by rotation (manually) of the ring 62 relative to the pump base 61. Affixed to the pump base 61, as shown, are one-way valves 66, which permit passage of air therethrough in only one direction, namely that indicated by the bold arrows on the valves 66 shown in FIGS. 13–15.

Referring to FIG. 13, pumping the bellows will force the air therein through the valve 66 located adjacent the port 64, which port is connected to the inflatable/deflatable construct of the invention (e.g., via plastic tubing not shown in FIG. 13). Upon compression of the bellows 70, no air flows through the one-way valve 66 located opposite port 64 adjacent the port 68. Upon recovery of the bellows, assisted by the spring 74 and the natural elasticity of the bellows, which preferably are constructed of plastic, air refills the bellows through the port 68 located opposite the inlet port 64, and this process is repeated as many times as needed to inflate the compartment(s) which are attached to the pump through port 64.

To forcibly expel air from the inflated compartment attached to the port 64, the ring 62 is rotated diametrically with respect to the pump base, as depicted in FIG. 15. Therein, on compression of the bellows, air is forcibly pumped out of the inflatable compartment, and into the atmosphere, all as indicated by the bold arrows in FIG. 15 on the one-way valves 66. On recovery of the bellows, air is drawn from the inflatable, and repeating these steps as before results in forced and rapid deflation of all compartments in the construction (garment, etc.) attached to port 64.

FIG. 14 illustrates the neutral configuration of the pump, through which no air flows, and in which the inflatable compartment is sealed.

The specific examples which follow are presented as illustrative of inflatable/deflatable constructions prepared according to the principles underlying the disclosed invention. However, these examples should not be construed as limiting in any way the scope of the invention disclosed herein, which scope is defined exclusively by the appended claims and equivalents thereof.

EXAMPLE 1

Figure 3:
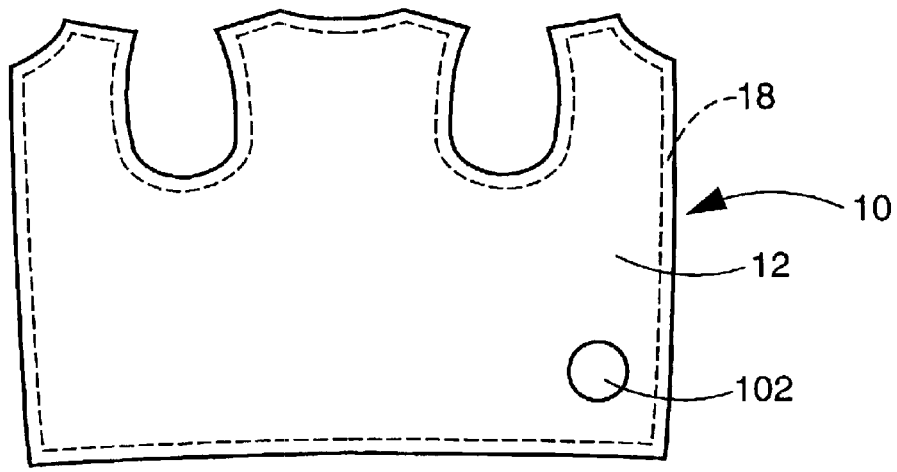
FIG. 3 depicts a cut-out pattern for constructing an inflatable vest, as in FIG. 1, in its unassembled, preparatory stage.

An insulated deflatable/inflatable garment in the form of a vest was fabricated by first cutting two fabric panels and a polyester batt layer all having substantially the geometry shown in FIG. 3. One fabric panel which was to be the outer panel comprised a laminate of a 90 g/m$^2$ polyester, circular knit, shell layer, a 30-micron thick microporous expanded PTFE membrane having a 15-micron thick, air-impermeable, moisture-vapor-permeable polyurethane layer laminated on the membrane side opposite the shell layer, and a 30 g/m$^2$ inner polyester warp knit layer. The second fabric panel, which was to be the inner panel, comprised a laminate of a 30-g/m$^2$ polyester, warp knit shell layer, a 30-micron thick, microporous expanded PTFE membrane having a 15-micron thick, air-impermeable, moisture-vapor-permeable polyurethane layer on the membrane side opposite the shell layer, and a 30 g/m$^2$ inner polyester warp knit layer. Such fabric panels are available from W. L. Gore & Associates, Inc., Newark, Del., under the trademark Gore-Tex® waterproof, breathable laminates. The outer fabric panel was laid flat with the warp knit facing upwardly. Next the polyester batt layer was laid on top of the fabric panel so that both layers had the same orientation. Such polyester batting is available from Albany International, Inc., Albany, N.Y., under the trademark Primaloft®. The preferred batt insulation was 3.0-oz/square yard batting, designated Primaloft Sport®. Then a reactive polyurethane adhesive bead was applied onto the batt layer in a pattern substantially corresponding to the pattern in FIG. 3, around the periphery thereof. Such reactive polyurethane adhesive is available from HB Fuller under the product code NP2075T. The adhesive was applied with a laydown rate of about 10 grams/linear meter between the inner, knit, textile layers. Next, the inner fabric panel was laid on top of the batt with the inner knit facing towards the adhesive bead and with an orientation aligning it with the lower layers. Sufficient pressure (0.2 bar) and heat (115° C.) were applied for a dwell time of 15 seconds such that the adhesive bead penetrated through the inner knit layer until it contacted the air-impermeable, moisture-vapor-permeable layer of the upper laminate and through the polyester batt and through the inner knit layer of the bottom laminate layer until it contacted the air impermeable, moisture vapor permeable layer of the bottom laminate. The applied adhesive was allowed to cure for a period of 48 hours. This bidirectional penetration of the laminate layers formed an airtight, waterproof seal through the entire multilayer assembly.

To form an inflation/deflation construct, a hole was cut in one of the fabric panels and a valve and fitting attached. In this example, the fitting was bonded to the fabric panel using a polyurethane adhesive.

The insulation level of this variably inflatable/deflatable insulated vest construct was adjustable by either extracting or injecting air into the sealed compartment therein through the attached valve and fitting.

EXAMPLE 2

An insulated deflatable/inflatable module of the present invention was constructed in the same manner as in Example 1 except different fabric panels were employed. In this example, both fabric panels comprised a 2-layer laminate of a polyester knit layer having an affixed waterproof, breathable monolithic polyurethane layer. Such waterproof, breathable polyurethane laminates are available from Narcote, LLC, Piney Flats, Tenn., as Part Number 2400-1710-1X-Black Interlock. Each fabric panel was oriented so that the monolithic polyurethane film was exposed toward the polyester batting and the textile was facing outwardly. This lay-up before and after sealing is depicted schematically in FIGS. 4–6, respectively.

To form an inflation/deflation module, a hole was cut in one of the fabric panels and a valve or fitting attached. In this example, the fitting was bonded to the fabric panel using a polyurethane adhesive.

The insulation level of this variable inflatable/deflatable insulated module was then adjustable by either extracting or injecting air into the sealed compartment therein through the attached valve or fitting.

EXAMPLE 3

An insulated deflatable/inflatable module of the present invention was constructed in the same manner as in Example 2 except different fabric panels were employed. In this example, both fabric panels comprised a 3-layer laminate of polyester knit outer and inner layers and a waterproof, breathable, monolithic polyurethane center layer. Such waterproof, breathable polyurethane laminates are available from Narcote, LLC, Piney Flats, Tenn., as Part Number 2400-1710-404 Black Fabric. Each pre-cut fabric panel was laid-up so that the knit that was desired to face inwardly was oriented toward the polyester batting, thus leaving the outer textile facing outwardly. This lay-up, after being adhesively sealed, is analogous to that depicted in FIG. 8.

To form an inflation/deflation module, a hole was cut in one of the fabric panels and a valve fitting attached. In this example, the fitting was bonded to the fabric panel using a polyurethane adhesive.

The insulation level of this variable inflatable/deflatable insulated module was then adjustable by either extracting or injecting air into the sealed compartment therein through the attached valve or fitting.

EXAMPLE 4

An insulated air mattress was constructed by first cutting two rectangular fabric panels having substantially the geometry shown in FIG. 9. Each fabric panel comprised a laminate of a polyester knit outer shell layer 42, a microporous expanded PTFE membrane 44 having an air-impermeable, moisture-vapor-permeable polyurethane layer on the membrane side opposite the shell layer, and an inner polyester knit layer 45. An extruded polyurethane adhesive bead 48, approximately 0.125" diameter, was laid in parallel lines and across the end as depicted in FIG. 9. Insulative batting 46 was then cut to the same pattern and laid on top of the first fabric panel and adhesive. The second fabric panel was then laid on top of the insulative batting. These three stacked layers were placed in a platen press which had a heated top platen and contained a raised shim so that pressure was applied predominately to the area of the adhesive beads. A clamping pressure of about 10 psi was generated on the raised area that encompassed the adhesive beading. The press was closed until the adhesive bead reached its melting temperature. The thermoplastic polyurethane adhesive used in this example had a melt temperature of 180° C. and a low melt viscosity. This process took about 1 minute to reach the desired temperature, the press was then opened, and the finished, insulated air mattress withdrawn. Fittings were glued into the opening 108 in one of the panels to allow air to be added or withdrawn using an external, portable removably attachable bellows pump, similar to that depicted in FIG. 12.

EXAMPLE 5

A waterproof sleeping bag was constructed by first cutting two rectangular fabric panels in dimensions of 36×72 inches. Each fabric panel comprised a laminate of a nylon woven outer shell layer, a microporous expanded PTFE membrane and an inner polyester knit layer. An extruded polyurethane adhesive bead approximately 0.2 inches in diameter was laid along both long and one short edge of the rectangle on one of the panels. Insulative batting was then cut to the same pattern and laid on top of the adhesive beads. Two layers of a liner fabric consisting of 60 g/m² woven nylon were placed on the batting, followed by a second layer of batting and the second nylon/expanded PTFE polyester laminate fabric panel. These stacked layers were then placed in a platen press. The press had a heated top platen and contained a raised shim so that pressure was applied predominately in the area of the adhesive beads. A clamping pressure of about 10 psi was generated in the raised area proximate the adhesive bead. The press was closed until the adhesive bead reached its melting temperature. The thermoplastic polyurethane adhesive used in this example was the low melt viscosity adhesive as above, which melted at approximately 180° C. This construction process took approximately 3 minutes to reach the desired temperature. The press was then opened and the finished sleeping bag was withdrawn. This process created a waterproof seam, as illustrated in FIG. 11, about the closed periphery of the sleeping bag. The fourth (entrance opening) side of the sleeping bag rectangle was finished by two sewn seams, each of which secured together one layer of nylon/expanded PTFE/polyester laminate, one layer of batting and one layer of polyester fabric. A draw cord was incorporated into these seams. This bag was substantially waterproof except for the entrance opening which, in use, would close around the neck of the user. Complete protection from the elements was achieved by the addition of the separate head cover 53 formed by a rectangle of the nylon/expanded PTFE/polyester laminate held in position with snap fasteners, as indicated in FIG. 11.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A multi-layered composite construct having at least one inflatable and deflatable compartment therein, said construct comprising:

at least two layers of a flexible, waterproof, air impermeable, optionally water-vapor-permeable material, the two layers forming at least one compartment therebetween, the two layers having at least one additional layer of a porous insulating material disposed between said two layers, and within said compartment, wherein said at least two layers and said additional layer are adhesively bonded together about the periphery of said compartment and, optionally, at discrete locations within the periphery of maid compartment, and wherein said adhesive penetrates said porous insulating material and bonds said layers together to form a waterproof, airtight seal for said compartment extending around the periphery of said compartment, said porous additional insulating material layer being otherwise unattached to at least one of said at least two layers, said compartment having at least one sealable opening therein through which air may be injected into or removed from said compartment, as desired, thereby inflating or deflating said compartment to a desired volume, and wherein said at least two layers are composite layers of (a) a flexible, first layer of hydrophobic material having a moisture vapor transmission rate exceeding 1000 gms/m$^2$/24 hours and an advancing water contact angle exceeding 90 degrees; and (b) a continuous Hydrophilic layer attached to the inner face of said first layer, said hydrophilic layer having a moisture vapor transmission rite exceeding 1000 gms/m$^2$/24 hours.

2. The construct of claim 1 wherein said hydrophobic layer is microporous, expanded polytetrafluoroethylene.

3. The construct of claim 1 wherein said hydrophilic layer is a polyether-polyurethane.

4. A multi-layered composite construct having at least one inflatable and deflatable compartment therein, said construct comprising:

at least two layers of a flexible, waterproof, air impermeable, optionally water-vapor-permeable material, the two layers forming at least one compartment therebetween, the two layers having at least one additional layer of a porous insulating material disposed between said two layers, and within said compartment, wherein said at least two layers and said additional layer are adhesively bonded together about the periphery of said compartment and, optionally, at discrete locations within the periphery of said compartment, and wherein said adhesive penetrates said porous insulating material and bonds said layers together to form a waterproof, airtight seal for said compartment extending around the periphery of said compartment, said porous additional insulating material layer being otherwise unattached to at least one of said at least two layers, said compartment having at least one directional valved opening therein through which air may be injected into or removed from said compartment, as desired, thereby inflating or deflating said compartment to a desired volume.

5. The construct of claim 4 being a garment.

6. The garment of claim 5 being a vest.

7. The garment of claim 5 being a jacket.

8. The construct of claim 4 wherein said waterproof, air impermeable, water-vapor-permeable material is a membrane of a thermoplastic polyurethane.

9. The construct of claim 4 wherein said at least one additional layer of insulating material is a layer of a batting material.

10. The construct of claim 4 adhesively bonded by an adhesive selected from the class consisting of polyurethane, reactive polyurethane, thermoplastic polyurethane, silicone, flexible epoxy and PVC adhesives.

11. The construct of claim 4 including at least one reinforcing layer affixed to each of said at least two layers of waterproof, air impermeable, water-vapor-permeable material.

12. The construct of claim 4 wherein said at least two layers are composite layers of (a) a flexible, first layer of hydrophobic material having a moisture vapor transmission rate exceeding 1000 gms/m$^2$/24 hours and an advancing water contact angle exceeding 90 degrees; and (b) a continuous hydrophillic layer attached to the inner face of said first layer, said hydrophilic layer having a moisture vapor transmission rate exceeding 1000 gms/m$^2$/24 hours.

13. The construct of claim 4 wherein the valve of said valved opening is bi-directional.

14. The construct of claim 4 wherein the valve of said valved opening is multi-directional.

15. The construct of claim 4 wherein the valve of said valved opening Is multi-directional.

16. The construct of claim 4 wherein said pump is a bellows pump and the valve of said valved opening is directional.

17. The construct of claim 4 wherein said valve is a one-way valve.

18. The construct of claim 4 wherein air is injected Into said compartment manually, by blowing into a tube affixed to said opening.

* * * * *

UNITED STATES PATENT AND TRADEMARK OFFICE
CERTIFICATE OF CORRECTION

PATENT NO. : 6,910,235 B2
DATED : June 28, 2005
INVENTOR(S) : Lack et al.

It is certified that error appears in the above-identified patent and that said Letters Patent is hereby corrected as shown below:

Title page,
Item [73], Assignee, change "Core" to -- Gore --.

Column 11,
Line 29, change "maid" to -- said --.
Line 47, change "Hydrophilic" to -- hydrophilic --.
Line 49, change "rite" to -- rate --.

Column 12,
Line 51, change "Is" to -- is --.
Line 57, change "Into" to -- into --.

Signed and Sealed this

Fourteenth Day of March, 2006

JON W. DUDAS
*Director of the United States Patent and Trademark Office*